United States Patent
Abramson et al.

(10) Patent No.: US 7,751,536 B1
(45) Date of Patent: Jul. 6, 2010

(54) LINE APPEARANCE RESERVATION FOR SIP ENDPOINTS

(75) Inventors: Sandra Rochelle Abramson, Freehold, NJ (US); Frank John Boyle, III, Denver, CO (US); Chandra Mouli Ravipati, Thornton, CO (US); Ryan Scott Wallach, Westminster, CO (US); Peter Andrew Mataga, Sparta, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1307 days.

(21) Appl. No.: 11/245,837

(22) Filed: Oct. 7, 2005

(51) Int. Cl.
*H04M 1/64* (2006.01)

(52) U.S. Cl. .................................. 379/88.17; 370/354

(58) Field of Classification Search ......... 370/352–356; 379/88.17
See application file for complete search history.

(56) References Cited

U.S. PATENT DOCUMENTS

| | | | |
|---|---|---|---|
| 6,307,932 B1 * | 10/2001 | Burritt et al. ........... 379/387.01 |
| 6,498,791 B2 * | 12/2002 | Pickett et al. ................ 370/353 |
| 6,798,767 B1 * | 9/2004 | Alexander et al. .......... 370/352 |
| 7,103,067 B1 * | 9/2006 | Singh et al. .................. 370/467 |
| 7,254,228 B2 * | 8/2007 | Segev et al. ............. 379/221.07 |
| 7,333,472 B2 * | 2/2008 | Yang et al. ................... 370/352 |
| 7,428,234 B2 * | 9/2008 | Forte-McRobbie et al. .. 370/352 |
| 7,457,278 B2 * | 11/2008 | Son et al. ..................... 370/351 |
| 7,480,260 B1 * | 1/2009 | Vashisht et al. ............. 370/260 |
| 2003/0072300 A1 | 4/2003 | Kwon |
| 2003/0169860 A1 * | 9/2003 | Chou ....................... 379/88.17 |
| 2003/0227540 A1 * | 12/2003 | Monroe ................... 348/14.02 |
| 2005/0025128 A1 | 2/2005 | Chiu |

FOREIGN PATENT DOCUMENTS

| EP | 1 113 659 A2 | 4/2001 |
|---|---|---|
| WO | WO 2005/018211 A1 | 2/2005 |

OTHER PUBLICATIONS

Polycom Administrator Guide Sound Point Sound Station IP SIP, copyright 2004, Nov. 17, 2004, 139 pages.
SIP Phone—Michael Robertson Launched New Company for Offer Free Worldwide Phone Calls, Aug. 6, 2003, 2 pages.
SIP Gets Serious, NetWorkWorld, Jun. 13, 2005, 3 pages.
Network Computing, In the Labs: IP PBXs, Sean Dougherty and Peter Morrissey, Mar. 17, 2005, 8 pages.

* cited by examiner

*Primary Examiner*—Simon Sing
(74) *Attorney, Agent, or Firm*—Sheridan Ross P.C.

(57) ABSTRACT

In one embodiment, a communication device includes an outgoing call alerting agent 196 that (i) detects that a communication device has entered an off-hook state and that a first line appearance has been selected by a user for an outgoing call, (ii) forwards a first call setup message to a third party call controller, the call setup message including a request to reserve the first line appearance for the outgoing call, and (iii) thereafter collects a set of digits dialed by the user for the outgoing call and provides the collected set of digits to the third party call controller.

18 Claims, 6 Drawing Sheets

LINE APPEARANCE RESERVATION FOR SIP ENDPOINTS

FIELD OF THE INVENTION

The invention relates generally to telecommunications and particularly to packet-switched telecommunications endpoints.

BACKGROUND OF THE INVENTION

Voice over IP or VoIP is becoming the telecommunications media of choice. In VoIP, real time voice communications are enabled using packets transmitted over the Internet. The Session Initiation Protocol or SIP is a simple signaling/application-layer control protocol widely used for VoIP. SIP provides the necessary protocol mechanisms for common circuit-switched telephone features such as call forwarding, callee and calling number delivery, personal mobility, terminal capability negotiation, caller and callee authentication, blind and supervised call transfer, and invitations to multicast conferences.

In SIP, setting up a call is straightforward. The calling terminal sends an INVITE message containing codec preferences. The answering terminal returns a "180 ringing" response and rings. When the user answers the call, the terminal sends an OK message with its own codec preferences and rings. Once the codec preferences are negotiated, the call proceeds.

To support mobility and higher-order application, SIP defines entities that help manage calls in different ways. The entities include registrars that maintain a map of "what IP address a given user is at right now", proxies that act as auto-responders, or forwarding agents, redirect servers that perform a subset of forwarding functions, proxy servers that perform call routing, session management, redirect functions, routing to media gateways, and user authentication, SIP user agents that initiate and manage the basic connection between two endpoints, and a SIP location server to maintain user profiles and provide subscriber registration.

Where a SIP endpoint supports multiple line appearances and acts as an extension on a switch, the SIP endpoint typically is unable to provide timely certain telephony features, such as line appearance updates and bridging functionality. A line appearance refers to a visual indicator on a communication device of the status of an associated communications channel. A line appearance is typically an LED and a key. When the channel is selected by pressing the key, the LED is illuminated to show that the channel is in use. Bridging refers to a third party connecting onto a channel between a callee and caller by activating a line appearance associated with one of the party's phones. For example, a secretary having a bridged line appearance for one of her boss' lines can connect to the line by pressing the key of the bridged line appearance. The failure to provide line appearance updates and bridging functionality is largely due to the SIP phone's deficiency in providing line appearance and busy indicator information to a switch. When a SIP phone goes off-hook, the phone, unlike a stimulus signaling phone, does not provide an off-hook signal to the switch. Rather, the SIP phone waits to receive all of the dialed digits and then forwards an INVITE to the switch containing the dialed digits. The dialed digits are provided to the switch as a group rather than individually. From the time that the SIP endpoint is off-hook and digits are being dialed, the switch is unaware of the changed status of the SIP endpoint and understands that the endpoint it still idle. Thus, bridged line appearances and busy indicators on other endpoints are not updated.

Another problem with SIP endpoints is line appearance collision. Line appearance collision occurs when a party on a SIP endpoint is dialing digits to make a call on a selected line appearance and a call is received by the switch for the SIP endpoint. Collision occurs when both the endpoint user and switch have selected the same line appearance, or channel, for the outgoing and incoming calls. The incoming call will be connected with the user who is expecting another party to answer. A "race" condition thus exists between the SIP endpoint and switch to determine who can first select the line appearance first and notify the other party of the selection.

SUMMARY OF THE INVENTION

These and other needs are addressed by the various embodiments and configurations of the present invention. The present invention is directed to an architecture and method for reserving line appearances and/or providing off-hook notification requests to a third party call controller.

In a first embodiment, a method is provided that includes the steps:

(a) detecting that a communication device has entered an off-hook state and that a line appearance has been selected by a user for an outgoing call;

(b) forwarding a call setup message to a third party call controller, the call setup message including a request to reserve the line appearance for the outgoing call; and (c) thereafter collecting a set of digits dialed by the user for the outgoing call and providing the collected set of digits to the third party call controller.

A "call setup message" refers to any message used in setting up and/or negotiating a voice call and includes an INVITE message under SIP, and a SETUP message under H.323 and ISDN.

In another embodiment, a communication device includes an outgoing call alerting agent that (i) detects when a communication device has entered an off-hook state and that a line appearance has been selected by a user for an outgoing call, (ii) forwards a call setup message to a third party call controller, the call setup message including a request to reserve the line appearance for the outgoing call, and (iii) thereafter collects a set of digits dialed by the user for the outgoing call and provides the collected set of digits to the third party call controller.

In another embodiment, a call controller (typically third party) includes an incoming call alerting agent that (i) receives, from a communication device, a request to reserve a line appearance for an outgoing call, (ii) responds to the request, and (iii) thereafter initiates the outgoing call on a channel associated with the line appearance (when the line appearance is idle).

In one configuration, a SIP telephone supports multiple line appearances and works as an extension to a switch/server that can deliver calls to specific line appearances. As will be appreciated, a SIP phone works much like a cell phone. A call is not actually made until the user is finished dialing the complete number of the called communication device. The communication device uses a parameter (e.g., "+avaya-cm-line") placed in the contact header of a SIP INVITE message sent to the switch/server to indicate that the identified line appearance that is being used for the call. The switch/server in turn uses a parameter placed in the Accept-Contact header of a SIP INVITE message sent to the phone when it delivers a call to indicate to the phone which line appearance should be used. The SIP phone further indicates to the switch/server (via an INVITE message) when it goes off-hook and the user is dialing a call. Because two INVITE messages are sent, the first including the line appearance number and the off-hook notification and the second the dialed digits, the standard SIP overlap dialing mechanism combined with the special URL in the first INVITE are used both (a) to indicate to the switch/server that dialing is complete and (b) to provide the dialed number to the switch/server.

The use of the parameter to indicate to the switch/server and to the communication device which line appearance is being used for a call makes it possible for the call controller to mark the line appearance in use while a phone is dialing and make the call while allocating resources for the call only once. The switch/server can control the amount of time a phone has to dial a number and signal to the phone when the time is up, ending the call. The switch/server can also deny the line appearance requested by the phone if the provisioning on the phone does not match the administration on the switch/server or if the switch/server has reserved the line appearance for an incoming call that has not yet been received by the phone.

The present invention can thus reduce substantially the delay in providing line appearance and busy indicator information to a switch. Immediately after the SIP endpoint is off-hook and before digits are dialed, the switch/server is made aware of the changed status of the SIP endpoint and understands that the endpoint is no longer idle. Thus, bridged line appearances and busy indicators on other endpoints are updated, commonly before the digits for the outgoing call are collected fully.

The present invention can also avoid line appearance collision. Because the off-hook and line appearance notifications are provided to the server before the user dials the call, the user can be alerted to an incoming call on the selected line appearance before he or she is done dialing the outgoing call. There is no longer a "race" condition between the SIP endpoint and switch/server to determine who is the first to select the line appearance and notify the other party of the selection.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide workflow routing assistance from a contact center agent.

Figure 1:
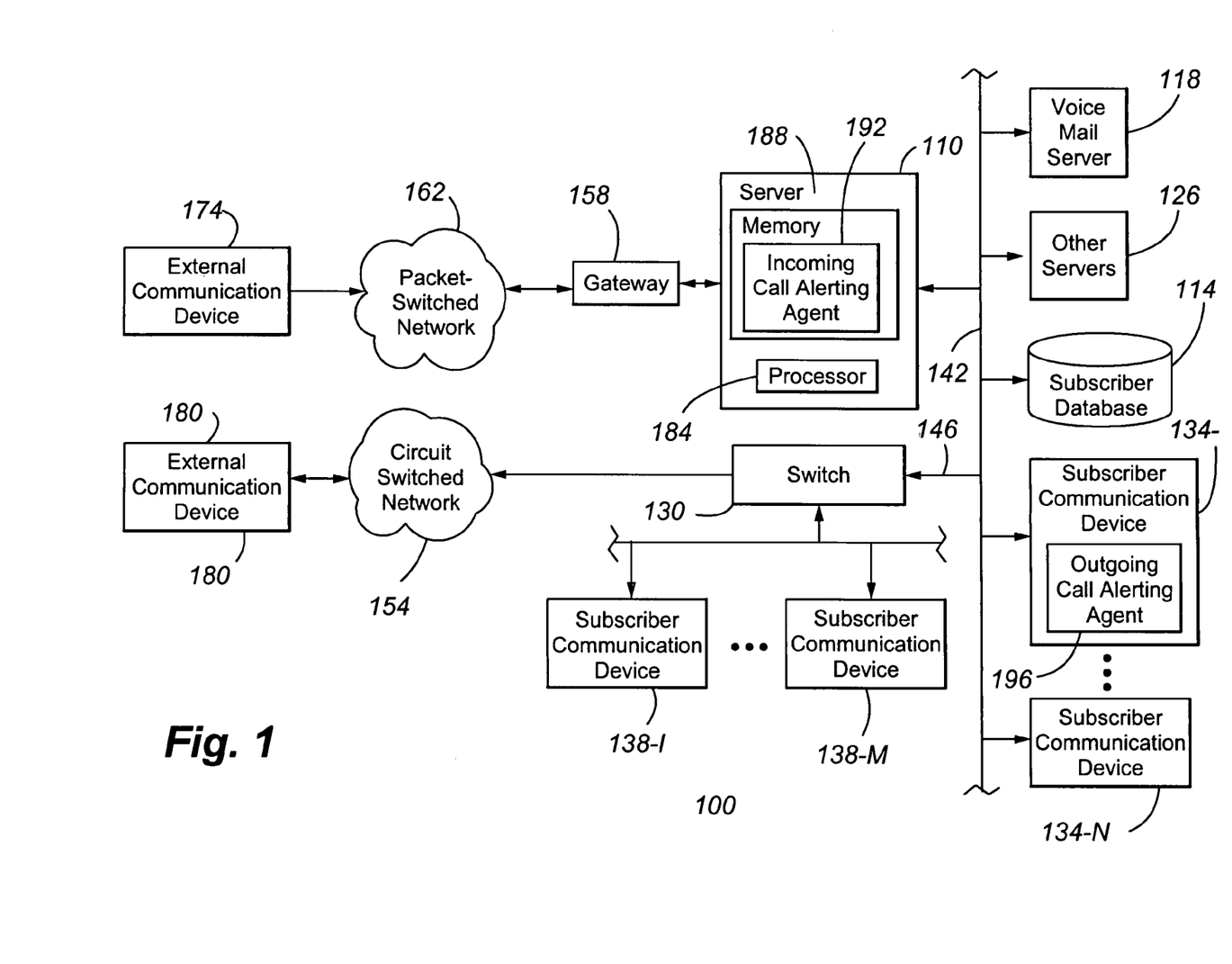
FIG. 1 is a block diagram of an enterprise network according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax server, a web server, SMTP and POP3 servers for relaying and receiving emails respectively, chat server to host chat sessions, instant messaging gateways, SMS/MMS gateways for receiving SMS/MMS messages through a mobile device, context analysis appliances, auto-responders, VoIP gateways, and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc. The switch 110 can be any suitable voice communication switching device, such as Private Branch eXchange or PBX, an Automatic Call Distributor or ACD, an enterprise switch, an enterprise server, or other type of telecommunications system switch or server, as well as other types of processor-based communication control devices such as media servers, computers, adjuncts, etc. The switch 110 directs contacts to one or more telecommunication devices and is preferably a modified form of Avaya Inc.'s Definity™Private-Branch Exchange (PBX)-based ACD system; MultiVantage™ PBX, CRM Central 2000 Server™, Communication Manager™, S8300™ media server, and/or Avaya Interaction Center™. Typically, the switch is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. One of the software functions performed by the switch includes third party call control functionality, which includes setting up, monitoring, and tearing down voice calls. The switch typically includes a network interface card (not shown) to provide services to the serviced telecommunication devices. Other types of known switches and servers are well known in the art and therefore not described in detail herein.

The gateway 158 can be any suitable gateway device, such as Avaya Inc.'s, G700™, G600™, MCC/SCC™ media gateways and may be implemented as hardware such as via an adjunct processor (as shown) or as a chip in the server.

The first telecommunication devices 134-1 . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1 . . . 138-M are circuit-switched. Each of the telecommunication devices 138-1 . . . 138-M corresponds to one of a set of internal extensions. The switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport media.

The packet-switched network 162 can be any data and/or distributed processing network, such as the Internet. The network 162 typically includes proxies (not shown), registrars (not shown), gatekeepers/gateways, and routers (not shown) for managing packet flows.

The packet-switched network 162 is in communication with an external first telecommunication device 174 via a gateway 158, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

The server 110 includes a processor 184 and memory 188. Included in memory 188 is an incoming call alerting agent 192 (which is typically part of the third party call controller functionality), which, together with the outgoing call alerting agent 196 in the subscriber communication device 134-1 provides incoming and outgoing call notifications, respectively, to reduce the likelihood of line appearance collisions. Call setup messages exchanged by the agents 192 and 196 include line appearance identifiers to identity a specific line appearance selected for a call. The line appearance is preferably included in the initial call setup message sent by agent 196 to agent 192. When the full number is dialed by the user of the communication device 134, a further setup message is sent to the server 110 containing the dialed number. The overlap dialing mechanism of SIP can be used to prevent collision between the two setup messages sent at different times by the endpoint.

The preferred signal flows will now be discussed with reference to FIGS. 2-4.

Figure 2:
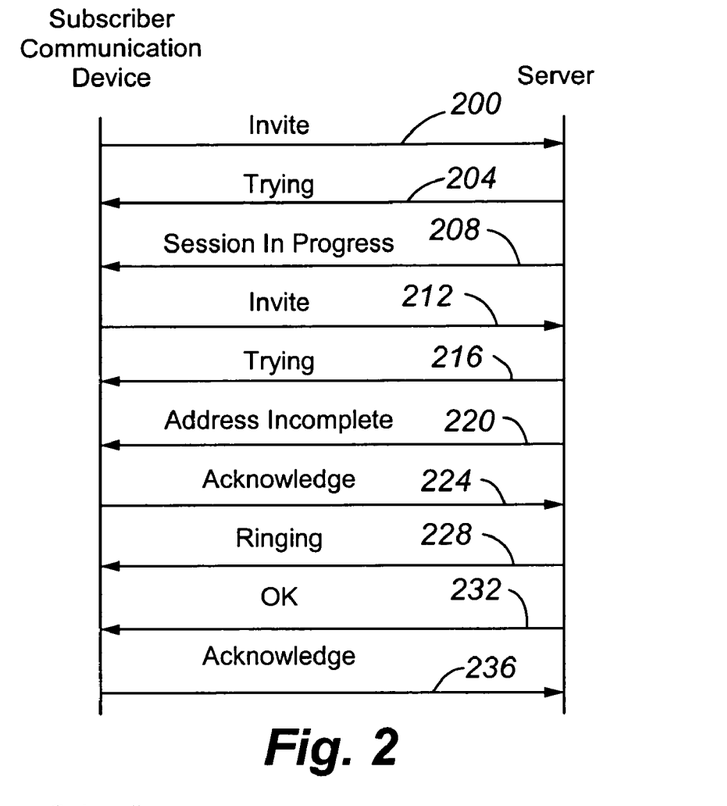
FIG. 2 shows call signaling flows according to an embodiment of the present invention.

FIG. 2 depicts the signal flows for an outgoing call from a communication device 134 where the device 134 reserves a line appearance. The signaling commences with an INVITE message 200 sent by the agent 196 to the server 110. The INVITE includes a parameter (e.g., "+avaya-cm-line") in the contact header of the INVITE message to indicate the line appearance that is being used for the call. The INVITE message further indicates to the server 110 that the device 134 is now in the off-hook state and that the user is dialing a call. In response, the server 110 returns a TRYING message 204 and a SESSION PROGRESS message 208. The message 208 indicates that the line appearance has been reserved for the outgoing call. A second INVITE message 212 is sent from the device 134 to the server 110 containing the same call identifier and the dialed digits. A second TRYING message 216 is sent by the server 110 to the device 134 followed by an ADDRESS INCOMPLETE message 220. In response, the device sends an ACKNOWLEDGE message 224. The server 110 then sends a RINGING message 228 followed by an OKAY message 232. The device 134 responds with an ACKNOWLEDGE message 236.

The signaling exchange is further described in the Table I below, which presents sample SIP messages generated by a subscriber device 134-1 that is initiating an outgoing call. The device 134-1 has an internal extension of 7502 on the server 110. Line appearance reservations and off-hook notifications in the SIP messages are italicized for the reader's convenience.

TABLE 1

| | Description | SIP Message |
|---|---|---|
| 1 | The user is on a device 134-1 that goes off-hook on call appearance 5. The device 134-1 sends an | INVITE sip:7502@example.com;avaya-cm-fnu=off-hook SIP/2.0<br>From: <sip:7502@example.com>;tag=random1<br>To: <sip:7502@example.com;avaya-cm-fnu=off-hook><br>Call-ID: call-random-1@10.0.75.2 |

TABLE 1-continued

| | Description | SIP Message |
|---|---|---|
| | INVITE message 200 to reserve call appearance 5. The off-hook notification is configured as a Universal Resource Locator to route the request to the feature. In this way, the server does not confuse the invite with an outgoing call set up reqest, and the feature is enabled. | CSeq: 1 INVITE<br>Via: SIP/2.0/UDP 10.0.75.2;branch=z9hG4bK-random-7502-0<br>Contact: <sip:7502@10.0.75.2>;+avaya-cm-line=5<br>Content-Length: 0 |
| 2 | The switch 110 sends 100 trying response 204. | SIP/2.0 100 Trying<br>From: <sip:7502@example.com>;tag=random1<br>To: <sip:7502@example.com;avaya-cm-fnu=off-hook><br>Call-ID: call-random-1@10.0.75.2<br>CSeq: 1 INVITE<br>Via: SIP/2.0/UDP 10.0.75.2;branch=z9hG4bK-random-7502-0.1<br>Server: Avaya Communication Manager |
| 3 | The switch 110 sends 183 response 208 to indicate that the line appearance has been reserved. At this point, the device can play a local dial tone. | SIP/2.0 183 Session Progress<br>From: <sip:7502@example.com>;tag=random1<br>To: <sip:7502@example.com;avaya-cm-fnu=off-hook>;tag=early-tag<br>Call-ID: call-random-1@10.0.75.2<br>CSeq: 1 INVITE<br>Via: SIP/2.0/UDP 10.0.75.2;branch=z9hG4bK-random-7502-0.1<br>Contact: <sip:7502@10.0.0.200;transport=tls><br>Content-Length: 0 |
| 4 | The user finishes dialing and device 134-1 sends an INVITE 212 with the same call identifier but this time with the dialed digits to the server 110. The server 110 matches this to the first INVITE 200 and places the call. | INVITE sip:3000@example.com SIP/2.0<br>From: <sip:7502@example.com>;tag=random1<br>To: <sip:3000@example.com><br>Call-ID: call-random-1@10.0.75.2<br>CSeq: 3 INVITE<br>Via: SIP/2.0/UDP 10.0.75.2;branch=z9hG4bK-random-7502-1-01<br>Contact: <sip:7502@10.0.75.2>;+avaya-cm-line=5<br>Content-Length: 304<br>Content-Type: application/sdp<br>v=0<br>o=−5 5 IN IP4 10.0.75.2<br>s=phone-call<br>c=IN IP4 10.0.75.2<br>t=0 0<br>m=audio 8766 RTP/AVP 0 98<br>a=rtpmap:0 pcmu/8000<br>a=rtpmap:98 telephone-event/8000 |
| 5 | The server 110 sends a 100 trying response 216 | SIP/2.0 100 Trying<br>From: <sip:7502@example.com>;tag=random1<br>To: <sip:3000@example.com><br>Call-ID: call-random1-1@10.0.75.2<br>CSeq: 3 INVITE<br>Via: SIP/2.0/UDP 10.0.75.2;branch=z9hG4bK-random-7502-1-1<br>Content-Length: 0 |
| 6 | The server 110 ends the early dialog used to reserve the line appearance | SIP/2.0 484 Address Incomplete<br>Call-ID: call-random1-1@10.0.75.2<br>CSeq: 1 INVITE<br>From: <sip:7502@example.com>;tag=random1<br>To: <sip:7502@example.com;avaya-cm-fnu=off-hook>;tag=early-tag<br>Content-Length: 0 |
| 7 | The device 134-1 acknowledges 224 the cancellation of the dialog used to reserve the line appearance. | ACK sip:7502@example.com;avaya-cm-fnu=off-hook SIP/2.0<br>Call-ID: call-random1-1@10.0.75.2<br>CSeq: 1 ACK<br>From: <sip:7502@example.com>;tag=random1<br>To: <sip:7502@example.com;avaya-cm-fnu=off-hook>;tag=early-tag<br>Content-Length: 0 |
| 8 | The server 110 sends a 180 ringing message 228 indicating that the call is ringing. | SIP/2.0 180 Ringing<br>From: <sip:7502@example.com>;tag=random1<br>To: <sip:3000@example.com>;tag=random2<br>Call-ID: call-random1-1@10.0.75.2<br>CSeq: 3 INVITE |

TABLE 1-continued

| Description | SIP Message |
|---|---|
| | Via: SIP/2.0/UDP 10.0.75.2;branch=z9hG4bK-random-7502-1-1<br>Contact: <sip:3000@10.0.0.200;transport=tls><br>Content-Type: application/sdp<br>Content-Length: 113<br>v=0<br>o=−1 2 IN IP4 10.0.0.200<br>s=−<br>c=IN IP4 10.0.0.209<br>t=0 0<br>m=audio 2056 RTP/AVP 0 98<br>a=rtpmap:0 PCMU/8000<br>a=rtpmap:96 telephone-event/8000 |
| 9 The server 110 sends a 200 OK message 232 indicating that the call has been answered. | SIP/2.0 200 OK<br>From: <sip:7502@example.com>;tag=random1<br>To: <sip:3000@example.com>;tag=random2<br>Call-ID: call-random1-1@10.0.75.2<br>CSeq: 3 INVITE<br>Via: SIP/2.0/UDP 10.0.75.2;branch=z9hG4bK-random-7502-1-1<br>Contact: <sip:3000@10.0.0.200;transport=tls><br>Content-Type: application/sdp<br>Content-Length: 113<br>v=0<br>o=−1 2 IN IP4 10.0.0.200<br>s=−<br>c=IN IP4 10.0.0.209<br>t=0 0<br>m=audio 2056 RTP/AVP 0 98<br>a=rtpmap:0 PCMU/8000<br>a=rtpmap:96 telephone-event/8000 |
| 10 The device 134-1 sends an acknowledge message 236 to complete the INVITE transaction. | ACK sip:3000@10.0.0.200;transport=tls SIP/2.0<br>From: <sip:7502@example.com>;tag=random1<br>To: <sip:3000@example.com>;tag=random2<br>Call-Id: call-random1-1@10.0.75.2<br>CSeq: 3 ACK<br>Via: SIP/2.0/UDP 10.0.75.2;branch=z9hG4bK-random-7502-1-1.1a<br>Content-Length: 0 |

Figure 3:
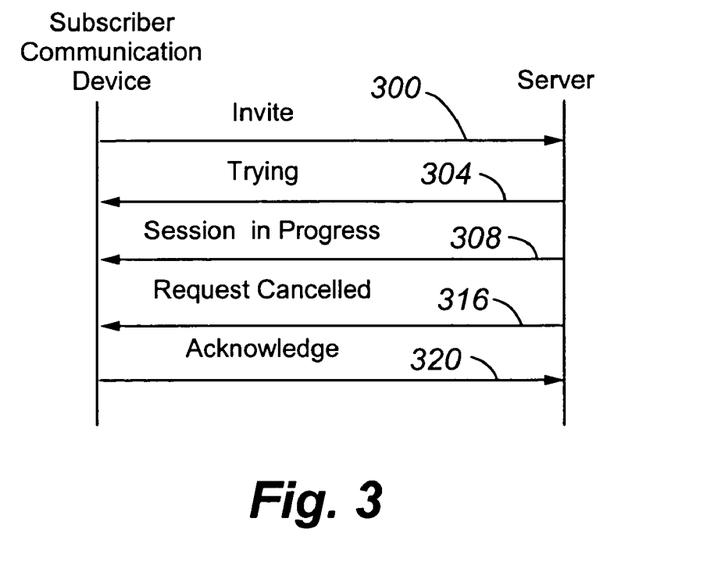
FIG. 3 shows call signaling flows according to an embodiment of the present invention.

In another example shown in FIG. 3, the server 110 terminates the line appearance reservation because the communication device has exceeded the maximum time for dialing. This example is illustrated by Table II below.

TABLE II

| Description | SIP Message |
|---|---|
| 1 The user on communication device 134-1 (having extension 7502 on the server 110) goes off-hook on call appearance 5. The device 134-1 sends INVITE 300 to reserve call appearance 5. | INVITE sip:7502@example.com;avaya-cm-fnu=off-hook SIP/2.0<br>From: <sip:7502@example.com>;tag=random1<br>To: <sip:7502@example.com;avaya-cm-fnu=off-hook><br>Call-ID: call-random-1@10.0.75.2<br>CSeq: 1 INVITE<br>Via: SIP/2.0/UDP 10.0.75.2;branch=z9hG4bK-random-7502-0.1<br>Contact: <sip:7502@10.0.75.2>;+avaya-cm-line=5<br>Content-Length: 0 |
| 2 The server 110 sends a 100 Trying message 304. | SIP/2.0 100 Trying<br>From: <sip:7502@example.com>;tag=random1<br>To: <sip:7502@example.com;avaya-cm-fnu=off-hook><br>Call-ID: call-random-1@10.0.75.2<br>CSeq: 1 INVITE<br>Via: SIP/2.0/UDP 10.0.75.2;branch=z9hG4bK-random-7502-0.1 |
| 3 The server 110 sends a 183 session progress message 308 to indicate that | SIP/2.0 183 Session Progress<br>From: <sip:7502@example.com>;tag=random1<br>To: <sip:7502@example.com;avaya-cm-fnu=off-hook>;tag=early-tag<br>Call-ID: call-random-1@10.0.75.2<br>CSeq: 1 INVITE<br>Via: SIP/2.0/UDP 10.0.75.2;branch=z9hG4bK-random-7502-0.1 |

TABLE II-continued

| | Description | SIP Message |
|---|---|---|
| | appearance has been reserved. | Contact:<sip:7502@10.0.0.200;transport=tls><br>Content-Length: 0 |
| 4 | The device 134-1 does not send another INVITE within an allowed dialing time. After expiration of the allowed dialing time, the server 110 sends a 487 request cancelled message 316 to show that line appearance reservation has timed out. | SIP/2.0 487 Request Cancelled<br>From: <sip:7502@example.com>;tag=random1<br>To: <sip:7502@example.com;avaya-cm-fnu=off-hook>;tag=early-tag<br>Call-ID: call-random-1@10.0.75.2<br>CSeq: 1 INVITE<br>Via: SIP/2.0/UDP 10.0.75.2;branch=z9hG4bK-random-7502-0.1<br>Content-Length: 0 |
| 5 | The device 134-1 sends an acknowledge message 320 to end the transaction. | ACK sip:7502@example.com;avaya-cm-fnu=off-hook SIP/2.0<br>From: <sip:7502@example.com>;tag=random1<br>To: <sip:7502@example.com;avaya-cm-fnu=off-hook>;tag=early-tag<br>Call-ID: call-random-1@10.0.75.2<br>CSeq: 1 INVITE<br>Via: SIP/2.0/UDP 10.0.75.2;branch=z9hG4bK-random-7502-0.1<br>Content-Length: 0<br>Max-Forwards: 70 |

Figure 4:
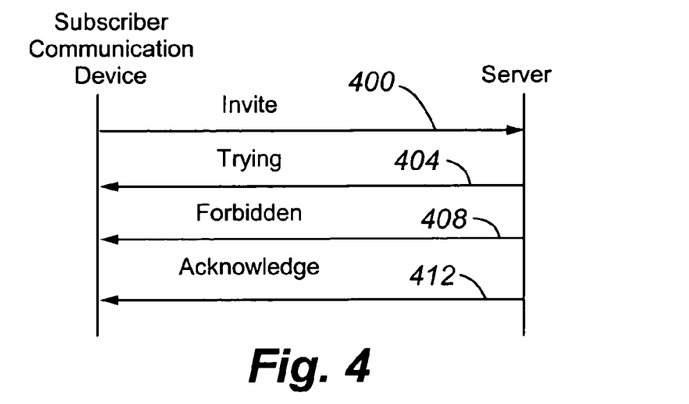
FIG. 4 shows call signaling flows according to an embodiment of the present invention.

In another example shown in FIG. 4, the server 110 rejects the line appearance reservation because the server 110 has chosen to deliver a call on the line appearance being requested but has not yet sent the INVITE message to the communication device. This example is illustrated by Table III below.

TABLE III

| | Description | SIP Message |
|---|---|---|
| 1 | The user on communication device 134-1 (having extension 7502 on the server 110) goes off-hook on call appearance 5. The device 134-1 sends INVITE 400 to reserve call appearance 5 | INVITE sip:7502@example.com;avaya-cm-fnu=off-hook SIP/2.0<br>From: <sip:7502@example.com>;tag=random1<br>To: <sip:7502@example.com;avaya-cm-fnu=off-hook><br>Call-ID: call-random-1@10.0.75.2<br>CSeq: 1 INVITE<br>Via: SIP/2.0/UDP 10.0.75.2;branch=z9hG4bK-random-7502-0.1<br>Contact: <sip:7502@10.0.75.2>;+avaya-cm-line=5<br>Content-Length: 0 |
| 2 | The server 110, in response, sends a 100 trying message 404. | SIP/2.0 100 Trying<br>From: <sip:7502@example.com>;tag=random1<br>To: <sip:7502@example.com;avaya-cm-fnu=off-hook><br>Call-ID: call-random-1@10.0.75.2<br>CSeq: 1 INVITE<br>Via: SIP/2.0/UDP 10.0.75.2;branch=z9hG4bK-random-7502-0.1 |
| 3 | The server 110 sends a 403 forbidden message 408 to indicate that the selected appearance is not available. | SIP/2.0 403 Forbidden<br>From: <sip:7502@example.com>;tag=random1<br>To: <sip:7502@example.com;avaya-cm-fnu=off-hook>;tag=early-tag<br>Call-ID: call-random-1@10.0.75.2<br>CSeq: 1 INVITE<br>Via: SIP/2.0/UDP 10.0.75.2;branch=z9hG4bK-random-7502-0.1<br>Content-Length: 0 |
| 4 | The device 134-1 sends an acknowledge message 412 to end the transaction. | ACK sip:7502@example.com;avaya-cm-fnu=off-hook SIP/2.0<br>From: <sip:7502@example.com>;tag=random1<br>To: <sip:7502@example.com;avaya-cm-fnu=off-hook>;tag=early-tag<br>Call-ID: call-random-1@10.0.75.2<br>CSeq: 1 INVITE<br>Via: SIP/2.0/UDP 10.0.75.2;branch=z9hG4bK-random-7502-0.1<br>Content-Length: 0 |

In a final example shown in Table IV, the server 110 delivers an incoming call to communication device 134-1 and instructs the device 134-1 to deliver the call on line appearance button number 1 of the device. The latter instruction is italicized.

TABLE IV

| Description | SIP Message |
|---|---|
| 1 The server 110 sends an Invite message to device 134-1. | INVITE sip:7502@10.0.75.2 SIP/2.0<br>From: <sip:3000@example.com>;tag=random1<br>To: <sip:7502@example.com><br>Call-ID: call-random-1@10.0.0.200<br>CSeq: 1 INVITE<br>Via: SIP/2.0/UDP<br>10.0.0.100:5060;branch=z9hG4bK-random-ccs-1-2,<br>Accept-Contact: *;+avaya-cm-line=1<br>Content-Type: application/sdp<br>Content-Length: 160<br>v=0<br>o=-1 2 IN IP4 10.0.0.200<br>s=-<br>c=IN IP4 10.0.0.209<br>t=0 0<br>m=audio 2056 RTP/AVP 0 18 98<br>a=rtpmap:0 pcmu/8000<br>a=rtpmap:18 g729/8000<br>a=fmtp:18 annexb=no<br>a=rtpmap:98 telephone-event/8000 |

The operations of the incoming and outgoing call alerting agents 192 and 196 will now be discussed with reference to FIGS. 5-8.

Figure 5:
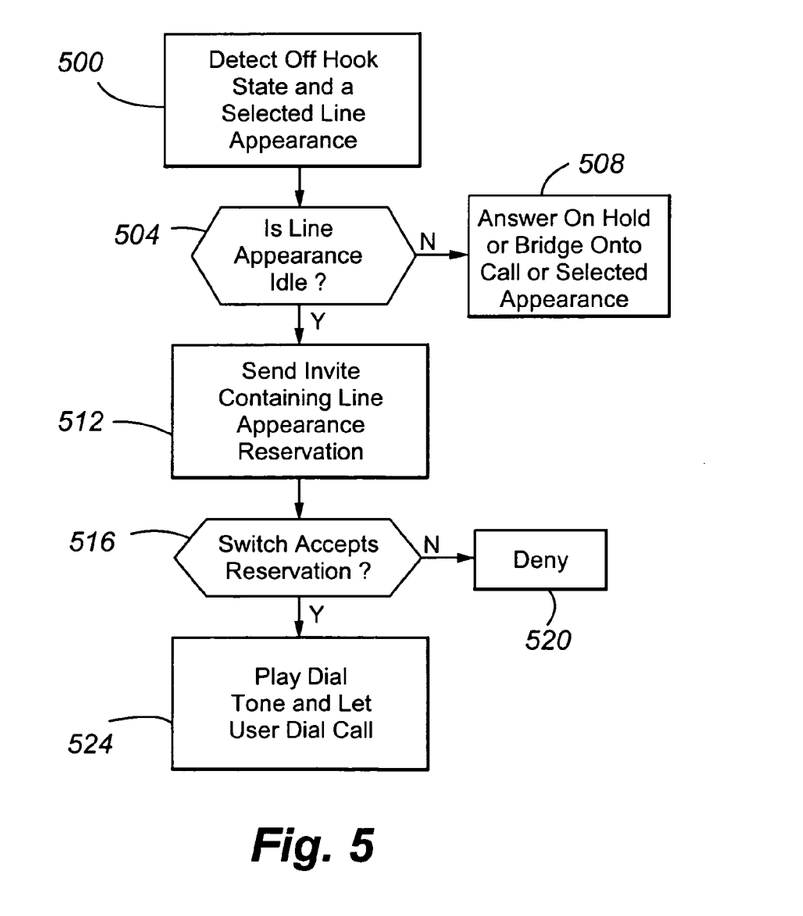
FIG. 5 is a flowchart according to an embodiment of the present invention.
Figure 6:
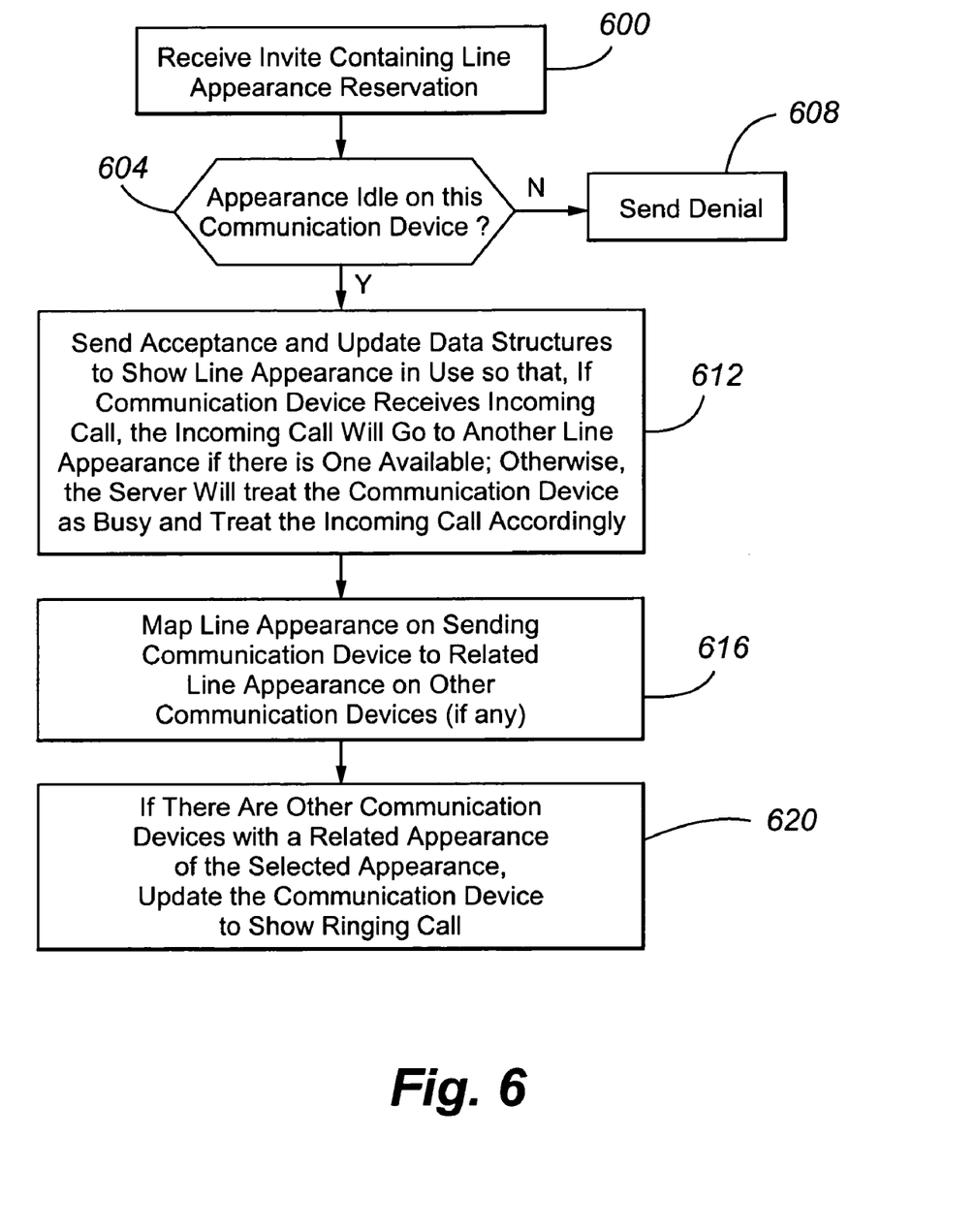
FIG. 6 is a flowchart according to an embodiment of the present invention.

Referring to FIGS. 5-6, the joint operation of the incoming and outgoing call alerting devices 192 and 196 is illustrated when an outgoing call is to be initiated by a subscriber/user of communication device 134-1.

In step 500, the agent 196 detects that the device 134-1 is in the off-hook state and the user has selected a line appearance. This can be done by known techniques, such as the user pressing a button associated with a line appearance or picking up the handset and pressing a line appearance button.

In decision diamond 504, the agent 196 determines whether or not the selected line appearance is idle. The line appearance is not idle when a call (either active or on hold) is already on the channel associated with the line appearance or when the server has notified the device 134-1 that it is in the process of delivering an incoming call on that channel. If the line appearance is not idle, the agent 196, in step 508, answers the call on hold, bridges onto the call, or delivers the incoming call on the selected line appearance, as the case may be.

If the line appearance is idle, the agent, in step 512, sends an invite message 200 (FIG. 2) to the server 110. The invite message 200 contains a request to make a line appearance reservation on the selected line appearance and a notification that the corresponding communication device 134-1 is now in the off-hook state.

In step 600 (FIG. 6), the server 110 receives the invite message 200 containing the line appearance reservation request.

In decision diamond 604, the server 110 determines whether the line appearance is idle on the communication device 134-1. The line appearance is not idle, for instance, when the server 110 is in the process of delivering an incoming call on that line appearance. If the line appearance is not idle, a denial message 408 (FIG. 4) is sent in step 608. If the line appearance is idle, the server 110, in step 612, sends a session progress message 208 (FIG. 2) indicating that the line appearance has been reserved. The server 110 further updates data structures to show that the line appearance is in use (not idle) so that, if the communication device receives an incoming call, the incoming call will go to another line appearance if there is one available. Otherwise, the server 110 will treat the communication device as busy and treat the incoming call accordingly (e.g., apply call coverage).

In step 616, the server 110 maps the selected line appearance on the communication device 134-1 to related line appearances (if any) on other communication devices. This mapping is done by conventional techniques.

In step 620, if there are other communication devices with a line appearance related to the selected line appearance, the communication devices having the related line appearances are updated to reflect that the corresponding channel is busy (e.g., the user is on a call).

Returning again to FIG. 5, in decision diamond 516 the agent 196 determines whether the switch has accepted the reservation request. If so, the communication device 134-1 plays a dial tone and permits the user to dial the numbers of the outgoing call. If the reservation request is denied, the communication device denies the user the ability to initiate the outgoing call on that line appearance.

Figure 7:
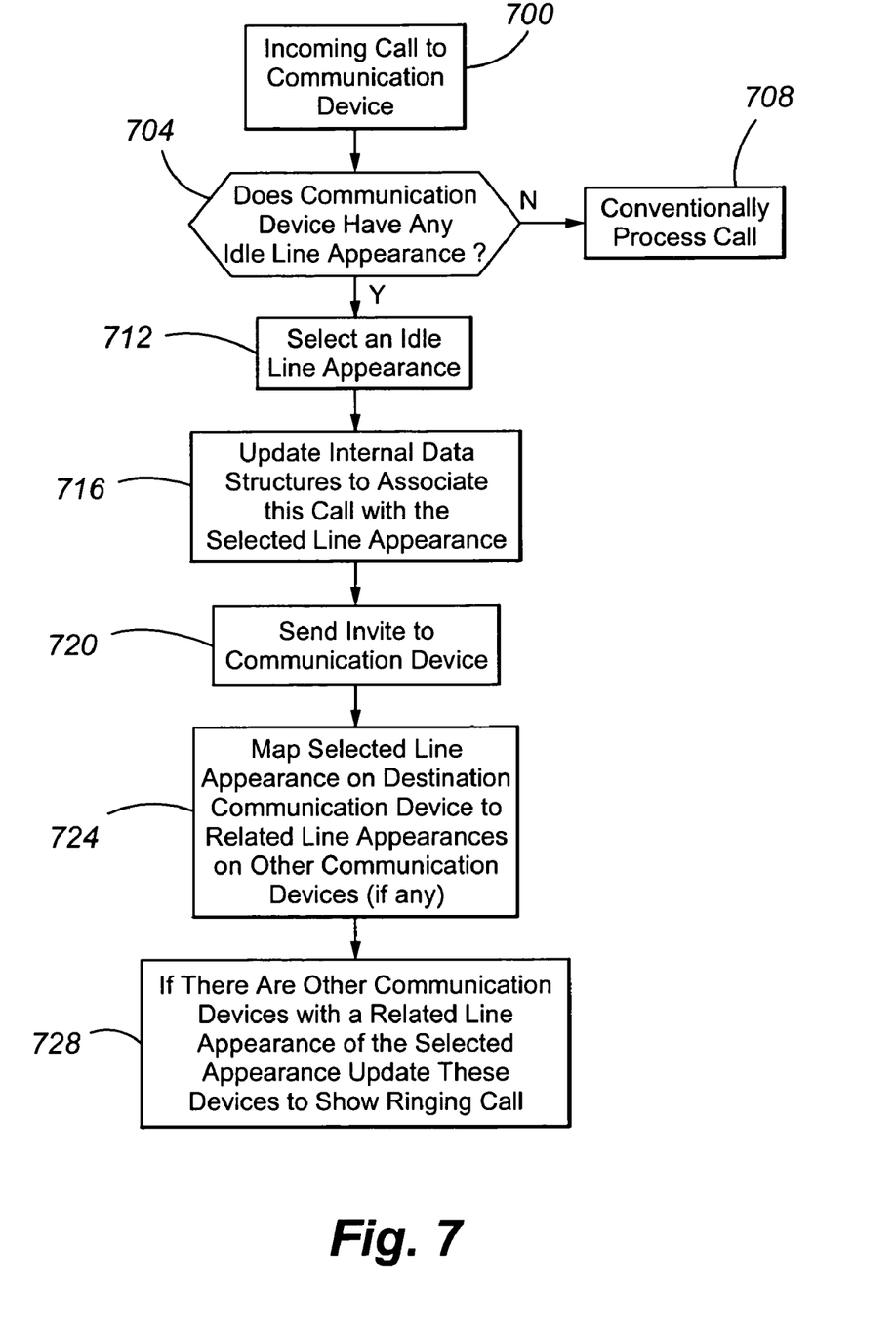
FIG. 7 is a flowchart according to an embodiment of the present invention.
Figure 8:
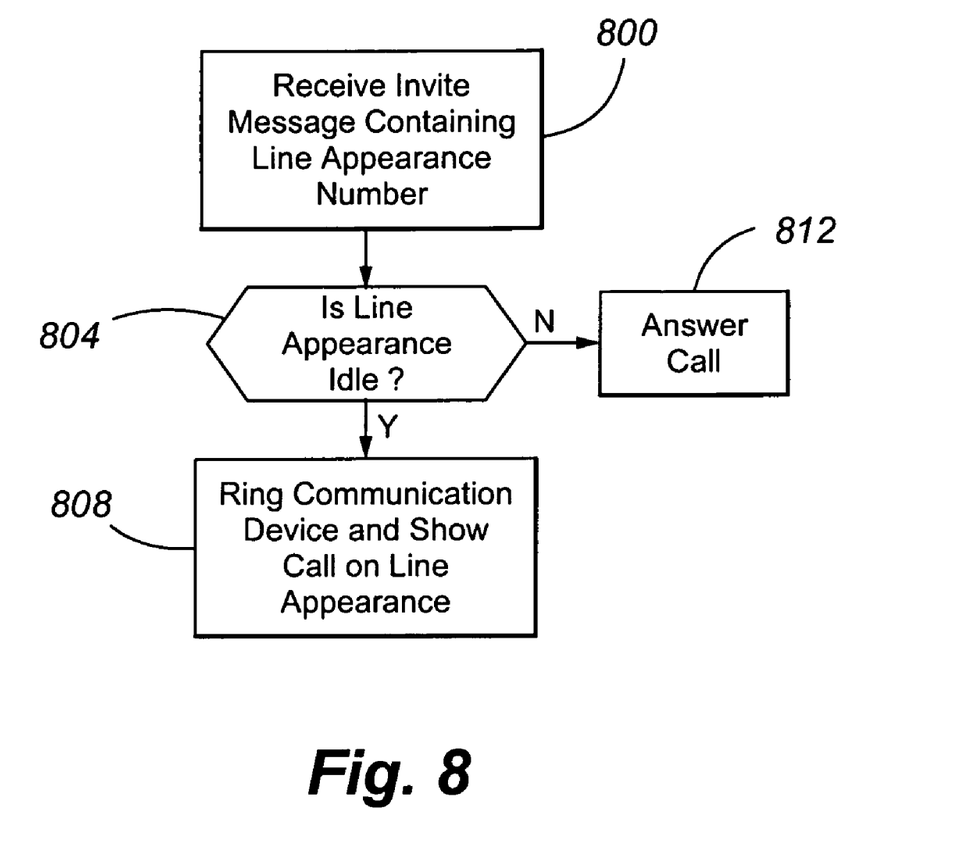
FIG. 8 is a flowchart according to an embodiment of the present invention.

Referring to FIGS. 7-8, the joint operation of the incoming and outgoing call alerting devices 192 and 196 is illustrated when an incoming call is received for the communication device 134-1.

In step 700, the server 110 receives an incoming call for the communication device 134-1.

In decision diamond 704, the server 110 determines whether the communication device 134-1 has any idle line appearances. If not, the server 110 processes the call conventionally in step 708, which includes applying call coverage, forwarding the call to the subscriber's voice mail, forwarding the call to another communication device, etc.

If the communication device 134-1 has an idle line appearance, the agent 192 selects an idle line appearance in step 712, updates the internal data structures to associate the call with the selected line appearance in step 716, and sends an invite to the communication device 134-1 in step 720. The invite is of the form shown in Table 4 above.

In step 724, the server 110 maps the selected line appearance on the destination communication device 134-1 to related line appearances (if any) on other communication devices. In step 728, if there are other communication devices with a related line appearance the related appearances are updated to show that the corresponding channel is busy (i.e., has a ringing call).

Turning now to FIG. 8, the invite message is received from the server 110 in step 800.

In decision diamond 804, the communication device 134-1 determines whether the line appearance identified in the invite message is idle. If not, the call on the line appearance is answered in step 812. In other words, the user has started to initiate a call on the channel corresponding to that line appearance. The line appearance reservation request will be denied by the server 110, and the communication device 134-1 will connect the user, on the selected channel, with the incoming call. If the line appearance is idle, the communication device 134-1 rings and shows a call on the line appearance in step 808.

A number of variations and modifications of the invention can be used. It would be possible to provide for some features of the invention without providing others.

For example in one alternative embodiment, the agents 192 and 196 can be implemented in software, hardware (such as a logic circuit (e.g., Application Specific Integrated Circuit or ASIC), or a combination thereof.

In another embodiment, the communication device is configured for other protocols, such as the H.323 protocol. It is preferred that the other protocols do not employ a stimulus model for providing collected digits to a third party call controller.

In another embodiment, the line number reservation request and/or off-hook notification is/are in a part of the message other than the header. For example, one or both can be in the payload or trailer of the message.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   detecting that a SIP communication device has entered an off-hook state;
   in response to the off-hook state of the SIP communication device, an outgoing call alerting agent determining that a user has selected a first line status for an outgoing call, wherein the first line status is associated with a first line appearance that is presented at least on the SIP communication device;
   the outgoing call alerting agent determining if the line is idle;
   if the line is not idle, denying the selection of the line status for the outgoing call;
   if the line is idle, the outgoing call alerting agent forwarding a first call setup message to a third party call controller for a SIP communication system, the first call setup message including a request to reserve the first line status for the outgoing call;
   receiving a response message from the third party controller associated with the first call setup message;
   after receiving the response message, the outgoing call alerting agent collecting a set of digits dialed by the user for the outgoing call; and
   the outgoing call alerting agent providing the collected set of digits to the third party call controller in a second call setup message.

2. The method of claim 1, wherein the first call setup message further includes an off-hook notification indicating that the SIP communication device is in the off-hook state.

3. The method of claim 1, wherein the first call setup message is a first INVITE and the collected set of digits are provided to the third party call controller in a second INVITE different from the first INVITE.

4. The method of claim 3, wherein the first and second INVITES include the same call identifier and further comprising:
   the third party call controller responding to the first INVITE with a message indicating that the line appearance has been reserved for the outgoing call;
   the third party call controller sending to the SIP communication device a third message ending the dialog associated with the first INVITE; and
   the third party call controller setting up the outgoing call using the collected set of digits.

5. The method of claim 1, further comprising:
   the third party call controller receiving the first call setup message;
   the third party call controller determining whether the first line is idle;
   if the first line is not idle, the third party call controller sending a fourth message denying the line reservation request; and
   if the first line is idle, the third party call controller sending the response accepting the line reservation request; and
   if the first line is idle, the third party controller updating data structures and related line appearances on other communication devices to show that the first line is in use.

6. The method of claim 1, wherein the SIP communication device receives a TRYING message and a SESSION IN PROGRESS message from the third party controller in response to the first call setup message.

7. The method of claim 5, wherein if the first line status is not idle, the SIP communication device connects the user with an incoming call on the first line.

8. A SIP communication device comprising:
   a memory;
   a processor in communication with the memory, the processor operable to execute an outgoing call alerting agent, the outgoing call agent operable to
   detect that the SIP communication device has entered an off-hook state,
   determine that a user has selected a first line status for an outgoing call, wherein the first line status is associated with a first line appearance presented on at least the SIP communication device,
   determine if the line is idle,
   if the line is idle, forward a first call setup message to a third party call controller, the call setup message including a request to reserve the first line for the outgoing call,
   if the line is not idle, denying the selection of the first line, thereafter collect a set of digits dialed by the user for the outgoing call, and provide the collected set of digits to the third party call controller in a second call setup message.

9. The device of claim 8, wherein the first call setup message further includes an off-hook notification indicating that the SIP communication device is in the off-hook state.

10. The device of claim 8, wherein the first call setup message is a first INVITE and the collected set of digits are provided to the third party call controller in a second INVITE different from the first INVITE.

11. The device of claim 10, wherein the SIP communication device receives a TRYING message and a SESSION IN PROGRESS message from the third party controller in response to the first INVITE and a TRYING message and ADDRESS INCOMPLETE message in response to the second INVITE.

12. The device of claim 8, if the line is not idle, the SIP communication device connects the user with an incoming call on the first line.

13. A SIP communication server, comprising:

a memory;

a processor in communication with the memory, the processor operable to execute an incoming call alerting agent, the incoming call alerting agent operable to receive, from a SIP communication device, a request to reserve a first line for an outgoing call, wherein the first line has a first line status that is represented by a first line appearance, determine if the line is idle, if the line is not idle, denying the request, if the line is idle, respond to the request reserving the line, receive a set of digits for the outgoing call, and after receiving the set of digits, initiate the outgoing call on a first channel associated with the first line.

14. The SIP communication server of claim 13, wherein the incoming call alerting agent receives, from the SIP communication device, first and second INVITES, wherein the first INVITE comprises the request to reserve the first line, wherein the second INVITE comprises the set of digits dialed by the user to make the outgoing call, wherein the first and second INVITES comprise the same call identifier, and wherein the incoming call alerting agent is further operable to respond to the first INVITE with a TRYING message indicating that the line appearance has been reserved for the outgoing call, send to the SIP communication device a SESSION IN PROGRESS message ending the dialog associated with the first INVITE, send a TRYING message and a ADDRESS INCOMPLETE in response to the second INVITE, and set up the outgoing call using the set of digits.

15. The SIP communication server of claim 13, when the first line is idle, the incoming call alerting agent is further operable to update data structures and related line appearances on other communication devices to show that the first line is in use.

16. The SIP communication server of claim 14, wherein the incoming call alerting agent receives an ACKNOWLEDGE message in response to the ADDRESS INCOMPLETE message sent to the SIP communication device and sends a RINGING message and an OK message in response to the ACKNOWLEDGE message.

17. The SIP communication server of claim 13, wherein the incoming call alerting agent receives the line reservation request before the set of digits received by the SIP communication device when the user dials the outgoing call.

18. The SIP communication server of claim 13, wherein the request further includes an off-hook notification indicating that the SIP communication device is in the off-hook state.

* * * * *